United States Patent
Kim et al.

(10) Patent No.: US 9,755,709 B2
(45) Date of Patent: Sep. 5, 2017

(54) METHOD AND APPARATUS FOR MEASURING CHANNEL QUALITY IN MULTIPLE INPUT MULTIPLE OUTPUT SYSTEM

(71) Applicant: Samsung Electronics Co., Ltd., Gyeonggi-do (KR)

(72) Inventors: Dong-Sik Kim, Gyeongsangbuk-do (KR); Soo-Bok Yeo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 4 days.

(21) Appl. No.: 14/733,414

(22) Filed: Jun. 8, 2015

(65) Prior Publication Data
US 2016/0065274 A1 Mar. 3, 2016

(30) Foreign Application Priority Data
Sep. 2, 2014 (KR) ........................ 10-2014-0116173

(51) Int. Cl.
*H04B 7/04* (2017.01)
*H04B 7/0413* (2017.01)
(Continued)

(52) U.S. Cl.
CPC ......... *H04B 7/0413* (2013.01); *H04B 17/336* (2015.01); *H04L 25/0202* (2013.01); *H04B 7/0632* (2013.01)

(58) Field of Classification Search
CPC ............. H04L 1/00; H04L 5/05; H04W 24/00
See application file for complete search history.

(56) References Cited

U.S. PATENT DOCUMENTS 7,606,319 B2    10/2009   Zhang et al.
8,520,755 B2    8/2013   Bachl et al.
(Continued)

FOREIGN PATENT DOCUMENTS

JP        2013-207355    10/2013
KR    10-2007-0038150    4/2007
(Continued)

OTHER PUBLICATIONS

Moon et al ("Link Performance Estimation Techniques for MIMO-OFDM Systems with Maximum Likelihood Receiver," Wireless Communications, IEEE Transactions on, vol. 11, pp. 1808-1816, May 2012).*

*Primary Examiner* — Jaison Joseph
(74) *Attorney, Agent, or Firm* — The Farrell Law Firm, P.C.

(57) ABSTRACT

A method and an apparatus for measuring channel quality in a MIMO system is provided. The method includes measuring a first SINR based on an assumption that a first detector is used, using a channel estimation value of a reception signal with respect to each of a plurality of space layers, and a second SINR for each of the plurality of space layers corresponding to a case where the plurality of space layers exist independently using the channel estimation value of the reception signal; determining a Log Likelihood Ratio of reception data based on an assumption that a second detector is used, with respect to each of the plurality of space layers; and generating channel quality information based on an assumption that the second detector is used, based on the first SINR and the second SINR with respect to each of the plurality of space layers, and the LLR.

12 Claims, 5 Drawing Sheets

(51) Int. Cl.
*H04L 25/02* (2006.01)
*H04B 17/336* (2015.01)
*H04B 7/06* (2006.01)

(56) References Cited

U.S. PATENT DOCUMENTS

| | | |
|---|---|---|
| 8,654,882 B2 | 2/2014 | Lee et al. |
| 9,048,893 B1 * | 6/2015 | Sun ................. H04L 1/0054 |
| 2011/0170586 A1 | 7/2011 | Bahng |
| 2013/0195023 A1 | 8/2013 | Vaisanen et al. |
| 2014/0321521 A1 * | 10/2014 | Lee ................. H04W 24/02 |
| | | 375/227 |
| 2014/0369215 A1 | 12/2014 | Yeo et al. |

FOREIGN PATENT DOCUMENTS

| | | |
|---|---|---|
| KR | 10-2008-0090037 | 10/2008 |
| KR | 10-2009-0040182 | 4/2009 |
| KR | 10-2009-0127016 | 12/2009 |
| KR | 10-2011-0083142 | 7/2011 |
| KR | 10-2012-0119935 | 11/2012 |
| KR | 10-2014-0145873 | 12/2014 |

* cited by examiner

METHOD AND APPARATUS FOR MEASURING CHANNEL QUALITY IN MULTIPLE INPUT MULTIPLE OUTPUT SYSTEM

PRIORITY

This application claims priority under 35 U.S.C. §119(a) to a Korean Patent Application filed on Sep. 2, 2014 in the Korean Intellectual Property Office and assigned Serial No. 10-2014-0116173, the entire contents of which are hereby incorporated by reference.

BACKGROUND

1. Field of the Disclosure

The present disclosure relates generally to a method and an apparatus for measuring channel quality in a Multiple Input Multiple Output (MIMO) system, and more particularly, to a method and an apparatus for performing channel parameterization to determine a metric indicating a performance of a detector, and generating channel quality information on the basis of the determined metric, in a MIMO system.

2. Description of the Related Art

A wireless communication system generally transmits data in a frame unit or a block unit. Currently, a coding rate and a modulation scheme of transmitted data are determined according to characteristics of a channel, and this content is adopted to be a standard in the current 3 Generation Partnership Project (3GPP) system. In addition, recently, a technology for increasing a data capacity through a scheme of using multiple antennas (e.g. Multiple Input Multiple Output (MIMO) system) in a wireless communication system has been developed and supplied. For example, in the current 3GPP Rel. 12, a standard relating to a MIMO system is being defined, and a scheme different from the conventional standard is being discussed. As described above, in a MIMO system, the coding rate and the Modulation scheme should be determined by considering characteristics of a channel in order to efficiently increase a data capacity.

In a current MIMO system, an adaptive transmission technology which considers channel characteristics is necessarily required in order to efficiently increase data capacity. However, when the adaptive transmission technology is used in the MIMO system, the coding rate and the modulation scheme of data are determined according to characteristics of a channel. Thus, an accurate measurement of channel quality is required in advance.

SUMMARY

An aspect of the present disclosure provides a method and an apparatus for measuring channel quality in a MIMO system.

Another aspect of the present disclosure provides a method and an apparatus for performing channel parameterization to determine a metric indicating a performance of a detector, and generating channel quality information on the basis of the determined metric, in a MIMO system.

Another aspect of the present disclosure provides a method and an apparatus for calculating a Mean Mutual Information per Bit (MMIB) based on a Signal to Interference Noise Ratio (SINR) acquired through channel estimation and an MMIB based on a Log Likelihood Ratio (LLR) for reception data and determining a parameter used for determining a performance of a Maximum Likelihood (ML) detector using the calculated MMIBs, in a MIMO system.

In accordance with an embodiment of the present disclosure, a method of measuring channel quality of an apparatus in a Multi Input Multi Output (MIMO) system is provided. The method includes measuring a first Signal to Interference Noise Ratio (SINR) based on an assumption that a first detector is used, using a channel estimation value of a reception signal with respect to each of a plurality of space layers, and a second SINR for each of a plurality of space layers corresponding to a case where the plurality of space layers exist independently using the channel estimation value of the reception signal; determining a Log Likelihood Ratio (LLR) of reception data based on an assumption that a second detector is used, with respect to each of the plurality of space layers; and generating channel quality information based on an assumption that the second detector is used, on the basis of the first SINR and the second SINR with respect to each of the plurality of space layers and the LLR.

In accordance with an embodiment of the present disclosure, an apparatus for measuring channel quality in a MIMO system is provided. The apparatus includes: an MMIB determination unit that measures a first Signal to Interference Noise Ratio (SINR) based on an assumption that a first detector is used, using a channel estimation value of a reception signal with respect to each of a plurality of space layers, and a second SINR for each of a plurality of space layers corresponding to a case where the plurality of space layers exist independently using the channel estimation value of the reception signal, and determines an LLR of reception data based on an assumption that a second detector is used, with respect to each of the plurality of space layers; and a channel quality information determination unit that generates channel quality information based on an assumption that the second detector is used, on the basis of the first SINR and the second SINR with respect to each of the plurality of space layers and the LLR.

BRIEF DESCRIPTION OF THE DRAWINGS

The above and other aspects, features, and advantages of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
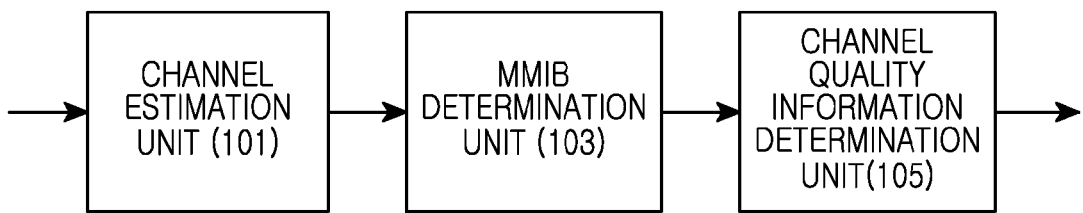
FIG. 1 is a block diagram illustrating an apparatus according to an embodiment of the present disclosure.

Hereinafter, embodiments of the present disclosure are described, with reference to the accompanying drawings. Further, in the description of the present disclosure, when a detailed description of a related well-known function or configuration would unnecessarily obfuscate the subject matter of an apparatus a for measuring channel quality in a MIMO system of the present disclosure, the detailed description is omitted. Further, terms described below are defined in consideration of functions of the present disclosure, but may vary according to the intention or convention of a user or operator. Therefore, the definitions of the terms should be determined based on the contents throughout the specification.

In the following description, an operation of determining a Channel Quality Indicator (CQI) on the basis of an SINR and an LLR in a MIMO communication system by an apparatus according to the present disclosure is described.

Hereinafter, in an embodiment of the present disclosure, the description will be made on the basis of an assumption that a spatial multiplexing scheme which transmits various independent pieces of data at the same time is used in a MIMO system for supporting a MIMO transmission/reception scheme. Hereinafter, in an embodiment of the present disclosure, Mean Mutual Information (MMI) is used as a basic metric in order to reflect a time and frequency selective fading channel characteristic. For example, when modulation schemes such as Quadrature Phase-Shift Keying (QPSK), 16 constellation point Quadrature Amplitude Modulation (16 QAM), and 64 constellation point QAM (64 QAM) are used in a MIMO system, an MMIB, which implies an amount of mean mutual information by each bit, is used. The MMIB, which is information indicating a physical mutual relationship between a transmission signal and a reception signal, may be represented to be 1 when an amount of information of the reception signal is identical to an amount of information of the transmission signal and may be represented to be 0 when the reception signal does not relate to the transmission signal. Thus, the MMIB may be used as an indicator which represents quality of a reception signal and/or a channel state of a reception signal. For example, when it is possible to perfectly restore a transmission signal due to a good channel state, the MMIB may converge on a value of 1, and when it is difficult to restore the transmission signal due to a poor channel state, the MMIB may converge on a value of 0. Thus, hereinafter, in an embodiment of the present disclosure, a method of determining MMIB on the basis of an SINR and generating accurate channel quality information on the basis of the determined MMIB is described.

First, hereinafter, a basic operation of the prevent disclosure is described with reference to the following equations.

The present disclosure assumes a reception signal model as expressed by Equation (1) as follows.

$$y_k = H_k x_k + n_k \ k=0,1,\ldots,k-1 \quad (1)$$

In Equation (1) above, $y_k$ and $x_k$ denote an N×1 reception signal vector and an L×1 transmission signal vector of a $k^{th}$ resource factor, respectively, wherein N denotes a number of reception antennas, and wherein L denotes the number of actually transmitted space layers. Further, $H_k$ denotes a MIMO channel of the $k^{th}$ resource factor and is expressed by Equation (2) as follows.

$$H_k = \begin{bmatrix} h_{k,0,0} & h_{k,0,1} & \cdots & h_{k,0,0} \\ h_{k,1,0} & h_{k,1,1} & \cdots & h_{k,1,L-1} \\ \vdots & \vdots & \ddots & \vdots \\ h_{k,N-1,0} & h_{k,N-1,1} & \cdots & h_{k,N-1,L-1} \end{bmatrix} = [h_{k,0} h_{k,1} \ldots h_{k,L-1}] \quad (2)$$

In Equation (2) above, $h_{k,l}$ denotes a channel vector corresponding to an $l^{th}$ space layer, and the other elements denote interference of the $l^{th}$ space layer. Further, $n_k$ denotes a noise dispersion vector, and in each element, an average thereof is 0, which corresponds to Additive White Gaussian Noise (AWN), a dispersion thereof is $\sigma_n^2$, wherein the element is independent and identically distributed (I.I.d.).

In the above reception signal model, a Maximum Likelihood (ML) for a transmission signal $x_k$ may be expressed by Equation (3) as follows.

$$\hat{x}_{ML,k} = \arg \min_{x \in A^L} \|y_k - H_k x\| \ k=0,1,\ldots,k-1 \quad (3)$$

In Equation (3) above, $\hat{x}_{ML,k}$ denotes a result obtained by detecting an ML for an N×1 transmission signal vector of a $k^{th}$ resource element. As in Equation (3), detecting the ML for a transmission signal is not expressed as a linear relationship of a reception signal. The nonlinear characteristics of the apparatus make it difficult to configure an adaptive parameter of the apparatus, In order to address this issue, an SINR when a Minimum Mean Squared Error (MMSE) is used (hereinafter, referred to as "$SINR_{MMSE}$") and an affective SINR in a situation where there is only a transmission signal, for example, in an interference free situation, (hereinafter, referred to as "$SINR_{IF}$") are configured to be boundary values for performance of a detector having the aforementioned nonlinear characteristics, and are used as an arithmetic mean, a geometric mean, and a harmonic mean. For example, a lower value among the $SINR_{MMSE}$ and the $SINR_{IF}$ may be configured to be a lower boundary and/or a higher value. The SINR based on the MMSE ($SINR_{MMSE}$) may be calculated on the basis of an assumption that an MMSE equalizer is used as a MIMO detector. For example, a transmission signal when an MMSE equalizer is used as a MIMO detector may be expressed to be a linear relationship as expressed by Equation (4) as follows.

$$\hat{x}_{MMSE,k} = [H_k^H H_k + \sigma_n^2 I]^{-1} H_k^H y_k, k=0,1,\ldots,k-1 \quad (4)$$

In Equation (4) above, denotes a result obtained by detecting an MMSE for an N×1 transmission signal vector of a $k^{th}$ resource element.

Further, when an MMSE equalizer is used as a MIMO detector, an effective SINR in each space layer may be calculated as expressed by Equation (5) as follows.

$$\gamma_{MMSE,k,l} = \frac{1}{\sigma_n^2 ([H_k^H H_k + \sigma_n^2 I]^{-1})_{l,l}} - 1 \quad (5)$$

In Equation (5) above, $\gamma_{MMSE,k,l}$ denotes an effective SINR ($SINR_{MMSE}$) in an $l^{th}$ space layer of a $k^{th}$ resource element when an MMSE equalizer is used as a MIMO detector.

Further, in a case where an MMSE equalizer is used as a MIMO detector, an effective SINR ($SINR_{IF}$) when all components influencing interference in an $l^{th}$ space layer are removed, that is, when there is no interference at the $l^{th}$ space layer can be calculated by Equation (6) as follows.

$$\gamma_{IF,k,l} = \frac{\|h_{k,l}\|^2}{\sigma_n^2} \quad (6)$$

In Equation (6) above, $\gamma_{IF,k,l}$ denotes an effective SINR ($SINR_{IF}$) in a situation where there is no interference in an $l^{th}$ space layer of a $k^{th}$ resource element.

In an embodiment of the present disclosure, as expressed in Equations (5) and (6), after the $SINR_{IF}$ and the $SINR_{MMSE}$ are calculated, MMIBs for the calculated $SINR_{IF}$ and the calculated $SINR_{MMSE}$ can be determined. For example, in an embodiment of the present disclosure, an MMIB (hereinafter, referred to as "$MMIB_{MMSE}$") corresponding to an effective SINR ($SINR_{MMSE}$) when an MMSE equalizer is used as a MIMO detector can be determined and an MMIB (hereinafter, referred to as "$MMIB_{IF}$") corresponding to an effective SINR ($SINR_{IF}$) when there is no interference can be determined. For example, the $MMIB_{MMSE}$ and the $MMIB_{IF}$ can be determined using a mapping function for the SINR and the MMIB.

A scheme of determining an $MMIB_{MMSE,k,l}$ corresponding to an effective SINR ($SINR_{MMSE}$) in an $l^{th}$ space layer of a $k^{th}$ resource element when an MMSE equalizer is used as a MIMO detector is expressed in Equation (7) as follows.

$$\mu_{MMSE,k,l} = I(\gamma_{MMSE,k,l}) \quad k=0,1,\ldots,k-1 \quad l=0,1,\ldots,L-1 \qquad (7)$$

In Equation (7) above, $I(\gamma_{MMSE,k,l})$ denotes a function for mapping an SINR to an MMIB. In an embodiment of the present disclosure, the $MMIB_{IF,k,l}$ corresponding to an effective SINR ($SINR_{IF}$) in a situation where there is no interference in an $l^{th}$ space layer of a $k^{th}$ resource element can be determined using the same scheme as Equation (7), that is, a function for mapping the SINR and the MMIB.

Thereafter, in an embodiment of the present disclosure, an average for $MMIB_{MMSE,k,l}$ and $MMIB_{IF,k,l}$ can be calculated by Equations (8) and (9) below with respect to a resource element.

$$\mu_{MMSE,l} = \frac{1}{K}\sum_{k=0}^{k-1} \mu_{MMSE,k,l} \quad l=0,1,\ldots,L-1 \qquad (8)$$

In Equation (8) above, $\mu_{MMSE,l}$ denotes an average MMIB in an $l^{th}$ space layer when an MMSE equalizer is used as a MIMO detector. Further, K denotes the number of resource elements.

$$\mu_{IF,l} = \frac{1}{K}\sum_{k=0}^{k-1} \mu_{IF,k,l} \quad l=0,1,\ldots,L-1 \qquad (9)$$

In Equation (9) above, denotes an average MMIB in an $l^{th}$ space layer in a situation where there is no interference because there is only one transmission signal. Further, K denotes the number of resource elements.

Referring to Equations (8) and (9) above, an MMIB when one codeword is formed has a high correlation with actual performance rather than an MMIB at each of the actual resource elements. Thus, in an embodiment of the present disclosure, an MMIB for each codeword is calculated using Equations (8) and (9) above in order to obtain a parameter relating to an ML detector when one codeword, but not each resource element, is formed. For example, in a case of a time and frequency selective channel being used by a wireless communication system, adjustment of a parameter for a detector for each resource element or each resource block has a very high calculation complexity, it is difficult to actually apply the adjustment to a system and it is not easy to determine a constant parameter value. Thus, in an embodiment of the present disclosure, a scheme of preferentially using an $SINR_{MMSE}$ and an $SINR_{IF}$ for each sub-carrier and calculating an $MMIB_{MMSE}$ and an $MMIB_{IF}$ corresponding to the $SINR_{MMSE}$ and the $SINR_{IF}$ with, respect to each codeword, respectively, thereby determines a parameter required for determining a performance representation metric of the ML detector.

When an ML detector is used in a codeword unit but not in a resource element unit, an $MMIB(\mu_{ML,l})$ in an $l^{th}$ space layer when the ML detector is used may be expressed by Equation (10) as follows.

$$\mu_{ML,l} = \beta_l \mu_{IF,l} + (1-\beta_l)\mu_{MMSE,l}, \quad l=0,1,\ldots,L-1 \qquad (10)$$

When an ML detector is used as in Equation (10) above, if an $MMIB(\mu_{ML,l})$ in an $l^{th}$ space layer is calculated, a parameter required for a performance representation metric (e.g., an $MMIB(\mu_{ML,l})$) of an ML detector can be configured for each codeword. For reference, in the standard of the Long Term Evolution (LTE) system, since the number of codewords is defined to be equal to or lower than 2, a parameter required for a performance representation metric of an ML detector in the LTE system may be limited to two cases. In an embodiment of the present disclosure, a parameter $\beta_l$ for a performance representation metric of an ML detector may be expressed by Equation (11) as follows.

$$\beta_l = \frac{\mu_{ML,l} - \mu_{MMSE,l}}{\mu_{IF,l} - \mu_{MMSE,l}} \quad l=0,1,\ldots,L-1 \qquad (11)$$

According to an embodiment of the present disclosure, $\mu_{IF,l}$ and $\mu_{MMSE,l}$ may be acquired by Equations (5) to (9) above. However, $\mu_{ML,l}$ is a value which cannot be acquired before a parameter $\beta_l$ relating to an ML detector is acquired. Thus, in an embodiment of the present disclosure, when an NIL detector is used, an LLR of data actually transmitted in a current frame or a current block is calculated, an MMIB ($MMIB_{DATA}$) of the corresponding frame is calculated on the basis of the calculated LLR, and a parameter $\beta_l$ relating to the ML detector is acquired using the calculated $MMIB_{DATA}$.

A scheme of, when an ML detector is used, calculating an LLR and calculating an average MMIB of a data block transmitted to the corresponding frame using the calculated LLR is expressed by Equation (12) as follows.

$$I(X;L) = \sum_{x=+1,-1} \int_{-\infty}^{\infty} f(L|x)P(x)\log_2 \frac{f(L|x)}{f(L)} dL = \qquad (12)$$

$$\frac{1}{2}\sum_{x=+1,-1}\int_{-\infty}^{\infty} f(L|x)\log_2 \frac{2f(L|x)}{(1+e^{-Lx})f(L|x)} dL =$$

$$1 - \frac{1}{2}\sum_{x=+1,-1}\int_{-\infty}^{\infty} f(L|x)\log_2(1+e^{-Lx}) dL =$$

$$1 - \int_{-\infty}^{\infty} f(L|x=+1)\log_2(1+e^{-L}) dL \approx$$

$$1 - \frac{1}{N}\sum_{n=0}^{N-1}\log_2(1+e^{-x_n L_n}) = 1 - \frac{1}{N}\sum_{n=0}^{N-1} H_b\left(\frac{1}{1+e^{|L_n|}}\right)$$

In Equation (12) above, $H_b$ denotes a binary entropy function.

Referring to Equation (12) above, since performance of the corresponding detector is already included in an LLR value, it is unnecessary to distinguish a property of the detector. In an embodiment of the present disclosure, although the description is made while being limited to an ML detector, when an LLR calculation equation such as Equation (12) above is used, it is natural that an MMIB on which a property of a detector used in the corresponding frame is reflected can be acquired even in a situation such as iterative detection and decoding.

Equation (12) above may be represented by Equation (13) as follows.

$$\mu_{DATA,l} = 1 - \frac{1}{M} \sum_{m=0}^{M-1} H_b\left(\frac{1}{1+e^{|L_m|}}\right) \quad l = 0, 1, \ldots, L-1 \quad (13)$$

In Equation (13), $\mu_{DATA,l}$ denotes an MMIB calculated on the basis of an LLR value of data actually passing through a channel. Further, $L_m$ denotes an LLR value of data actually passing through a channel.

Equation (13) may be represented by Equation (14) below in order to acquire a parameter $\beta_l$ required for calculating an MMIB when an ML detector is used.

$$\beta_l = \frac{\mu_{DATA,l} - \mu_{MMSE,l}}{\mu_{IF,l} - \mu_{MMSE,l}} \quad l = 0, 1, \ldots, L-1 \quad (14)$$

As described above, in an embodiment of the present disclosure, $\mu_{IF,l}$, $\mu_{MMSE,l}$ and $\mu_{DATA,l}$ can be acquired from Equations (5) to (9), (11) and (12) above, and a parameter $\beta_l$ required for calculating a performance representation metric of an ML detector can be acquired through Equation (14) above using the acquired values.

The acquired parameter $\beta_l$ may be independently used for each frame, and may be used together with the value calculated in a previous frame according to a frame. However, since data is actually transmitted while being limited to a certain modulation order and a certain coding rate, and an actual CQI should perform a calculation with respect to all modulation orders and coding rates, an approximate equation such as Equation (15) below is used for other modulation orders.

$$\beta_{l,p',q'} = \max(l, \min(\beta_{l,p,q} - \alpha(p'-p)(q'-q))) \quad l=0, 1, \ldots, L-1 \quad (15)$$

In Equation (15) above, p and q denote modulation orders of codewords when the number of codewords being currently transmitted is 2, respectively. Further, p' and q' denote not-transmitted modulation orders, respectively.

Figure 3:
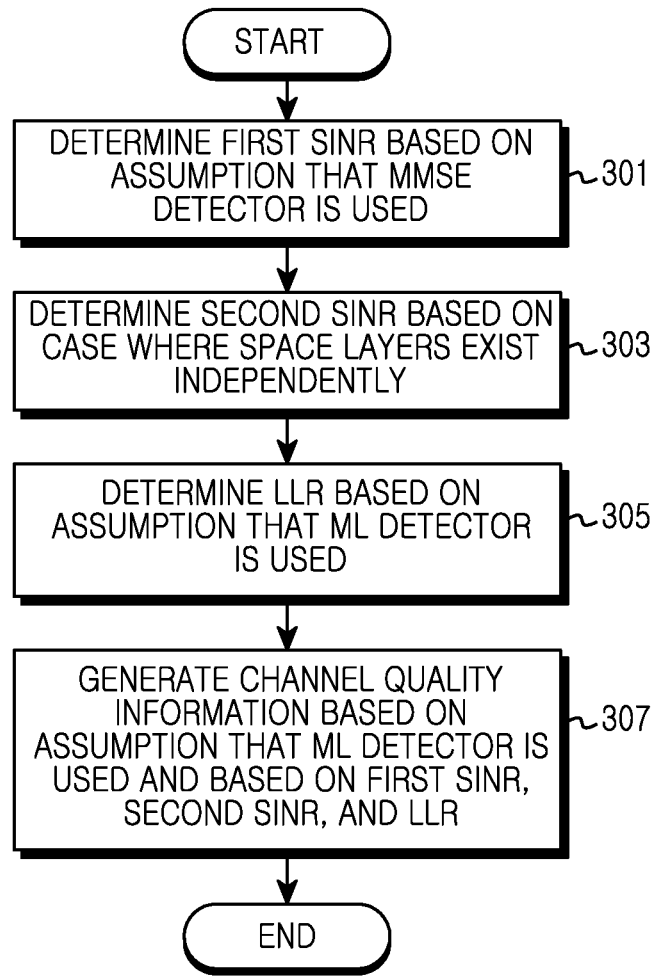
FIG. 3 is a flowchart of a method of generating channel quality information by an apparatus according to an embodiment of the present disclosure.

Additionally, as in Equation (13) above, since calculating an MMIB using a binary entropy function $H_b$ is performed by a combination of nonlinear functions such as an exponential function, a rational function, and a binary function, the calculation complexity is high. Thus, in an embodiment of the present disclosure, as illustrated in FIG. 3 and described below, an MMIB corresponding to an LLR for actual transmission data can be determined using a graph or a search table indicating a mapping relation between an LLR absolute value and the MMIB.

FIG. 1 is a block diagram illustrating an apparatus according to an embodiment of the present disclosure.

Referring to FIG. 1, the apparatus includes a channel estimation unit 101, an MMIB determination unit 103, and a channel quality information determination unit 105.

The channel estimation unit 101 estimates a channel between a transmitter and the apparatus and provides the estimated channel information to the MMIB determination unit 103. For example, the channel estimation unit 101 may estimate a channel using a pilot signal received from the transmitter.

The MMIB determination unit 103 receives a channel estimation result from the channel estimation unit 101 and estimates an effective SINR ($SINR_{IF}$) when there is no interference because there is one effective SINR ($SINR_{MMSE}$) and one transmission signal at each space layer when an MMSE equalizer is used as a MIMO detector. Thereafter, the MMIB determination unit 103 calculates an MMIB corresponding to the effective SINR ($SINR_{IF}$) when there is no interference because there is one effective SINR ($SINR_{MMSE}$) and one transmission signal at each space layer when an MMSE equalizer is used as a MIMO detector.

In addition, the determination unit 103 calculates an LLR for data which is transmitted from the transmitter and received through a wireless channel. Thereafter, the MMIB determination unit 103 calculates an MMIB ($MMIB_{DATA}$) on the basis of the LLR for data actually received through a channel.

In addition, the MMIB determination unit 103 can calculate a parameter $\beta_l$ to be used for calculating an MMIB for an ML detector using an $MMIB_{MMSE}$ and an $MMIB_{IF}$ calculated on the basis of an $MMIB_{DATA}$ and an SINR corresponding to an LLR of data. Thereafter, the MMIB determination unit 103 calculates an MMIB for a case where an ML detector is used, using the calculated $\beta_l$.

The channel quality information determination unit 105 determinates and/or calculates a CQI on the basis of the MMIB calculated by the MMIB determination unit 103.

Figure 2:
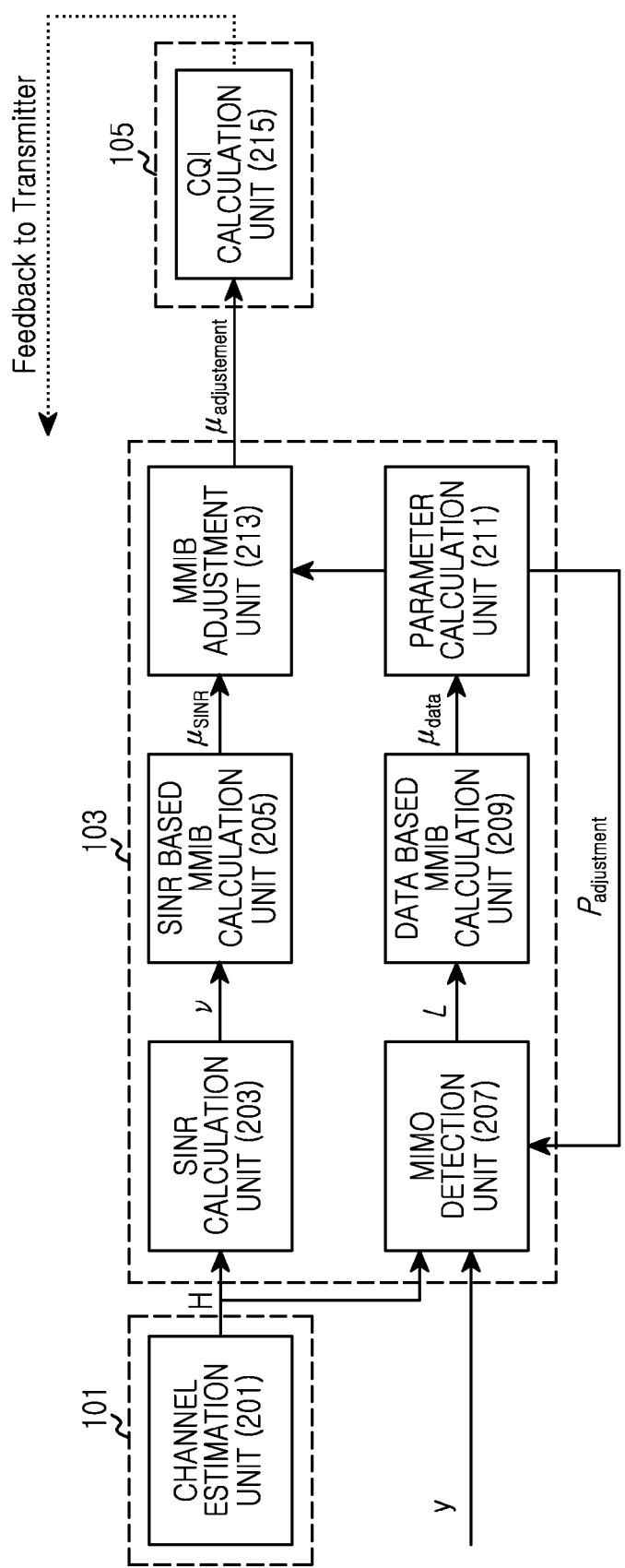
FIG. 2 is a block diagram illustrating an apparatus according to an embodiment of the present disclosure.

FIG. 2 is a block diagram illustrating an apparatus according to an embodiment of the present disclosure.

Referring to FIG. 2, an apparatus includes a channel estimation unit 101, an MMIB determination unit 103, and a channel quality information determination unit 105.

In more detail, the channel estimation unit 101 further includes a channel estimation unit 201 and components required for channel estimation.

Further, the MMIB determination unit 103 includes an SINR calculation unit 203, an SINR based MMIB calculation unit 205, a MIMO detection unit 207, a data based MMIB calculation unit 209, a parameter calculation unit 211, and an MMIB adjustment unit 213.

Additionally, the channel quality information determination unit 105 further includes a CQI calculation unit 215 and components required for determining channel quality information.

The channel estimation unit 201 estimates a channel between a transmitter and an apparatus and provides the estimated channel information to the SINR calculation unit 203 and the MIMO detection unit 207. For example, the channel estimation unit 201 can estimate a channel using a pilot signal received from the transmitter.

The SINR calculation unit 203 receives a channel estimation result from the channel estimation unit 201 and estimates an effective SINR ($SINR_{IF}$) when there is no interference because there is one effective SINR ($SINR_{MMSE}$) and one transmission signal at each space layer when an MMSE equalizer is used as a MIMO detector. For example, the SINR calculation unit 203 calculates an effective SINR ($SINR_{MMSE}$) in an $l^{th}$ space layer of a $k^{th}$ resource element when an MMSE equalizer is used as a MIMO detector, on the basis of Equation (5) above. Further, the SINR calculation unit 203 calculates an effective SINR ($SINR_{IF}$) when there is no interference because there is one transmission signal, on the basis of Equation (6) above.

The SINR based MMIB calculation unit 205 receives input of the effective SINR ($SINR_{IF}$) when there is no interference because there is one effective SINR ($SINR_{MMSE}$) and one transmission signal at each space layer when an MMSE equalizer is used as a MIMO detector, and calculates an MMIB corresponding to the input effective SINR. For example, the SINR based MMIB calculation unit 205 can calculate an $MMIB_{MMSE}$ corresponding to an effective $SINR_{MMSE}$ in an $l^{th}$ space layer of a $k^{th}$ resource element when an MMSE equalizer is used as a MIMO detector, on the basis of a function of mapping the SINR to MMIB, as indicated by Equation (7) above, and acquire an $MMIB_{IF}$ corresponding to an effective $SINR_{IF}$ in an $l^{th}$ space layer of a $k^{th}$ resource element when there is no interference because there is only one transmission signal. Thereafter, the SINR based MMIB calculation unit 205 can calculate an average of the $MMIB_{MMSE}$ and the $MMIB_{IF}$ on the basis of Equations (8) and (9) above.

Further, the MMIB detection unit 207 calculates an LLR for data which is transmitted from the transmitter and received through a wireless channel. For example, the MIMO detection unit 207 calculates as LLR for data actually received through a channel when an ML detector is used, in a scheme indicated in Equation (12) above. Further, the MIMO detection unit 207 can receive input of a parameter $\beta_l$ from the parameter calculation unit 211 and perform a function of detecting an ML for a received signal on the basis of the input parameter $\beta_l$.

Figure 5:
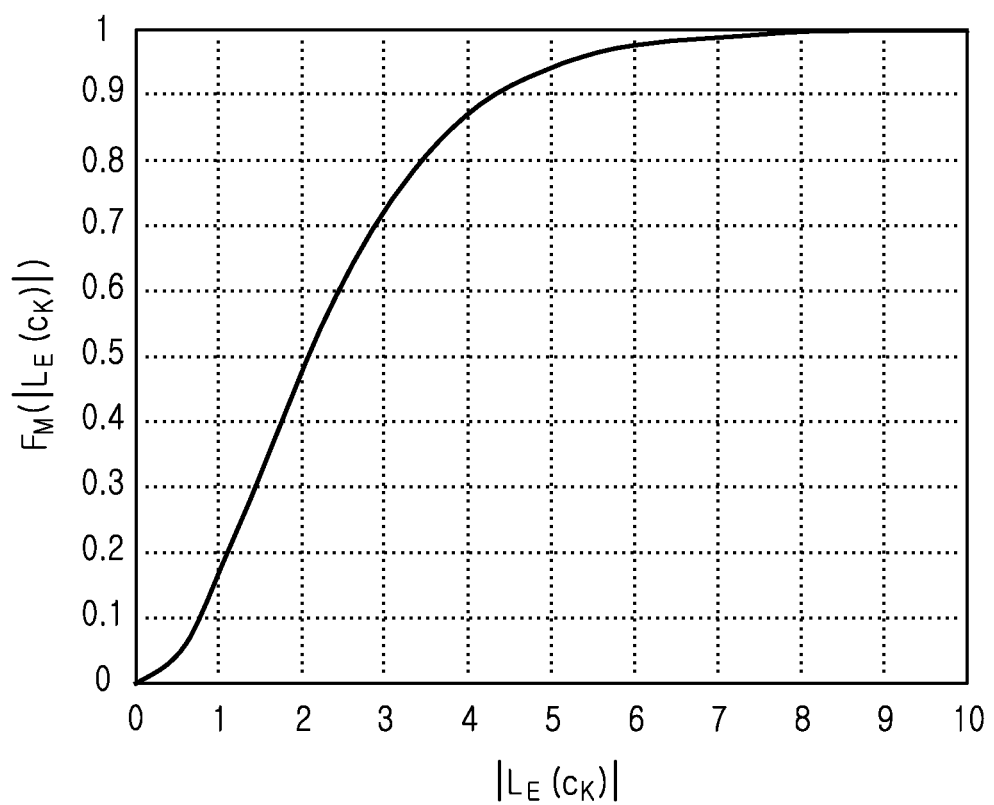
FIG. 5 is a graph for determining an MMIB corresponding to an LLR absolute value by an apparatus according to an embodiment of the present disclosure.

The data based MMIB calculation unit 209 receives an LLR for data actually received through a channel, and calculates an MMIB ($MMIB_{DATA}$) on the basis of the input LLR. For example, the data based MMIB calculation unit 209 calculates an $MMIB_{DATA}$ for an LLR on the basis of Equation (13) above. As another example, the data based MMIB calculation unit 209 may determine an $MMIB_{DATA}$ corresponding to an LLR for actually-transmitted data using a previously stored graph or a previously stored search table indicating a mapping relation between an LLR absolute value and an MMIB as illustrated in FIG. 5 and described below.

The parameter calculation unit 211 can receive input of the $MMIB_{DATA}$ corresponding to the LLR of data from the data based MMIB calculation unit 209, receive, from the SINR based calculation unit 205, input of MMIBs, e.g., the $MMIB_{MMSE}$ and the $MMIB_{IF}$, which are calculated on the basis of the SINR, and calculate a parameter $\beta_l$ to be used for calculating an MMIB for an ML detector using the input MMIBs. For example, the parameter calculation unit 211 can calculate a parameter $\beta_l$ in an $l^{th}$ space layer using the $MMIB_{DATA}$, the $MMIB_{MMSE}$, and the $MMIB_{IF}$ at the $l^{th}$ space layer as indicated by Equation (14) above. Further, the parameter calculation unit 211 can calculate a parameter $\beta_l$ for a modulation order and a coding rate which are not used for actual data transmission. For example, since data actually received through a channel is based on a modulation order and a coding rate actually used in a system, a parameter $\beta_l$ corresponding to another modulation order can be calculated using Equation (15) above. The parameter calculation unit 211 can provide the calculated parameter $\beta_l$ to the MIMO detection unit 207 and the MMIB adjustment unit 213.

The MMIB adjustment unit 213 receives, from the SINR based calculation unit 205, input of the MMIBs, e.g., the $MMIB_{MMSE}$ and the $MMIB_{IF}$ which are calculated on the basis of the SINR receives input of the parameter $\beta_l$ from the parameter calculation unit 211, and calculates an MMIB when an ML detector is used. For example, the MMIB adjustment unit 213 can calculate an $MMIB_{ML}$ ($\beta_{ML,l}$) in an $l^{th}$ space layer when an ML detector is used as indicated by Equation (10) above.

The CQI calculation unit 215 receives, from the MMIB adjustment unit 213, input of the $MMIB_{ML}$ ($\mu_{ML,l}$) in an $l^{th}$ space layer when an ML detector is used and determines and/or calculates a CQI on the basis of the input $MMIB_{ML}$ ($\mu_{ML,l}$). Thereafter, the CQI calculation unit 215 feeds back the calculated CQI to a transmitter.

FIG. 3 is a flowchart of a method of generating channel quality information by an apparatus according to an embodiment of the present disclosure.

Referring to FIG. 3, in step 301, the apparatus determines a first SINR on the basis of an assumption that an MMSE detector is used. In other words, the apparatus determines an SINR ($SINR_{MMSE}$) at each space layer on the basis of an assumption that an MMSE equalizer is used as a MIMO detector.

Thereafter, in step 303, the apparatus determines a second SINR on the basis of an assumption that each space layer exists independently. In other words, the apparatus determines an SINR ($SINR_{IF}$) when there is no interference because there is only one transmission signal.

Thereafter, in step 305, the apparatus determines an LLR on the basis of an assumption that an ML detector is used. In other words, the apparatus calculates an LLR for data which is transmitted from a transmitter and actually received through a wireless channel.

Thereafter, in step 307, the apparatus generates channel quality information on the basis of an assumption that an ML detector is used and on the basis of the first SINR, the second SINR, and the LLR. A detailed method of generating channel quality, information on the basis of an assumption that an ML detector is used and on the basis of the first SINR ($SINR_{MMSE}$), the second SINR ($SINR_{IF}$) and the LLR is described below with reference to the accompanying drawings.

Thereafter, the apparatus terminates a procedure according to an embodiment of the present disclosure.

The method described above can be implemented in a device (e.g., a chip set).

Figure 4:
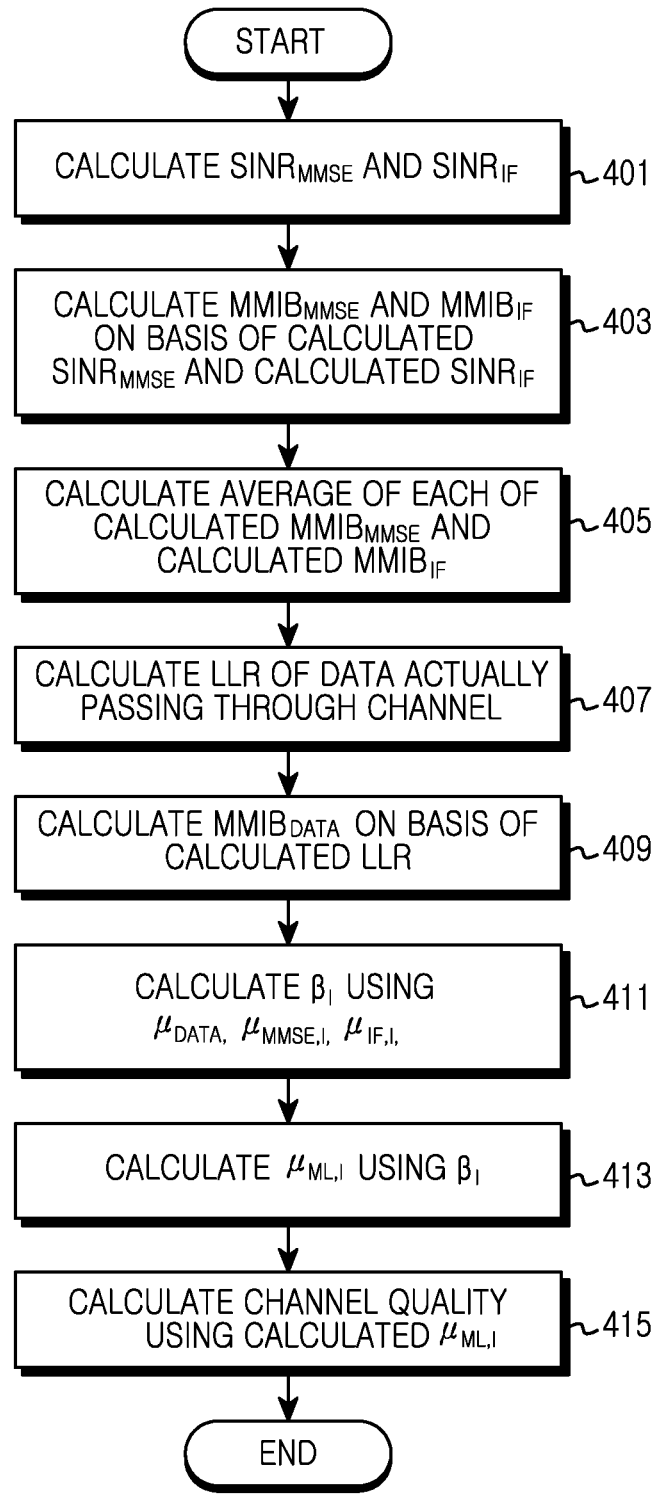
FIG. 4 is a flowchart of a method of calculating channel quality by an apparatus according to an embodiment of the present disclosure.

FIG. 4 is a flowchart of a method of calculating a channel quality by an apparatus according to an embodiment of the present disclosure.

Referring to G. 4, in step 401, the apparatus calculates an effective SINR ($SINR_{MMSE}$) at each space layer when an MMSE equalizer is used as a MIMO detector and an effective SINR ($SINR_{IF}$) when there is no interference because there is one transmission signal. For example, the apparatus can estimate a channel between a transmitter and the apparatus, calculate the effective SINR ($SINR_{MMSE}$) in an $l^{th}$ space layer of a $k^{th}$ resource element when MMSE equalizer is used as a MIMO detector, on the basis of Equation (5) above, and calculate the effective SINR ($SINR_{IF}$) when there is no interference because there is only one transmission signal, on the basis of Equation (6) above.

Then, in step 403, the apparatus calculates an $MMIB_{MMSE}$ and an MMIB corresponding to the effective SINR ($SINR_{IF}$) when there is no interference because there is one effective SINR ($SINR_{MMSE}$) and one transmission signal at each space layer when an MMSE equalizer is used as a MIMO detector. For example, the apparatus can calculate an $MMIB_{MMSE}$ corresponding to an effective $SINR_{MMSE}$ in an $l^{th}$ space layer of a $k^{th}$ resource element when an MMSE equalizer is used as a MIMO detector, on the basis of a function of mapping the SINR to the MMIB, as indicated by Equation (7) above, and calculate an $MMIB_{IF}$ corresponding to an effective $SINR_{IF}$ in an $l^{th}$ space layer of a $k^{th}$ resource element when there is no interference because there is only one transmission signal.

Then, in step 405, the apparatus calculates an average of the $MMIB_{MMSE}$ and the $MMIB_{IF}$. For example, as indicated by Equations (8) and (9) above, the apparatus can calculate the average of the $MMIB_{MMSE}$ and the $MMIB_{IF}$ and can acquire an average MMIB in an $l^{th}$ apace layer when an MMSE equalizer is used as a MIMO detector and an average MMIB in an $l^{th}$ space layer when there is no interference if an MMSE equalizer is used as a MIMO detector. Additionally, the apparatus can determine an average for each codeword.

Then, in step 407, the apparatus calculates an LLR for data which is transmitted from a transmitter and actually received through a wireless channel. For example, the apparatus calculates an LLR for data actually received through a channel when an ML detector is used, in a scheme indicated in Equation (12) above.

Then, in step 409, the apparatus calculates an MMIB ($MMIB_{DATA}$) on the basis of the LLR for data actually received through a channel. For example, the apparatus can calculate an $MMIB_{DATA}$ for an LLR on the basis of Equation (13) above. As another example, as illustrated in FIG. 3 and described above, the apparatus can determine an $MMIB_{DATA}$ corresponding to an LLR for actually-transmitted data using a previously stored graph or a previously stored search table indicating a mapping relation between an LLR absolute value and an MMIB.

Then, in step 411, the apparatus calculates a parameter $\beta_l$ to be used for calculating an MMIB for an ML detector using the $MMIB_{DATA}$, the $MMIB_{MMSE}$, and the $MMIB_{IF}$. For example, the apparatus can calculate a parameter $\beta_l$ in an $l^{th}$ space layer using the $MMIB_{DATA}$ the $MMIB_{MMSE}$, and the $MMIB_{IF}$ at the $l^{th}$ space layer as indicated by Equation (14) above. Additionally, the apparatus can calculate a parameter $\beta_l$ for a modulation order and a coding rate which are not used for actual data transmission. For example, since data actually received through a channel is based on a modulation order and a coding rate actually used in a system, a parameter $\beta_l$ corresponding to another modulation order can be calculated using Equation (15) above.

Then, in step 413, the apparatus calculates an $MMIB_{ML}$ ($\mu_{ML,l}$) when an ML detector is used, using the parameter $\beta_l$. For example, the apparatus can calculate an $MMIB_{ML}(\mu_{ML,l})$ in an $l^{th}$ space layer when an ML detector is used, using Equation (10) above, on the basis of the parameter $\beta_l$ calculated in step 411 and the $MMIB_{MMSE}$ and the $MMIB_{IF}$ calculated in step 403.

Then, in step 415, the apparatus calculates channel quality, using the $MMIB_{ML}(\mu_{ML,l})$ when an ML detector is used. In this case, the apparatus can determine and generate channel quality indication information using the $MMIB_{ML}$ ($\mu_{ML,l}$), and feed back the generated channel quality indication information to a transmitter.

Then, the apparatus can terminate a procedure according to an embodiment of the present disclosure.

Although a detailed description of the present disclosure is made with regard to a detailed embodiment, a system, an apparatus, and a method disclosed in the present specification may be modified, added, or omitted without departing from the scope and spirit of the present disclosure. For example, a component of the system and the apparatus may be coupled or separated. In addition, an operation of the system and the apparatus may be executed by more apparatuses, fewer apparatuses, or other apparatuses. The method may include more steps, fewer steps, or other steps. Further, the steps may be coupled and/or executed in a different predetermined sequence.

Although the present disclosure is disclosed with respect to the above described embodiments, various changes and modifications may be made by those skilled in the art. The present disclosure is intended to include modifications and changes within the scope of the present disclosure, as defined by the appended claims and their equivalents.

What is claimed is:

1. A method for operating an apparatus for measuring channel quality in a multi input multi output (MIMO) system, the method comprising:
   determining a first mean mutual information per bit (MMIB) for a codeword based on an assumption that a first signal is received at a spatial layer by using a first detector;
   determining a second MMIB for the codeword based on an assumption that a second signal having no interference with other signals is received at the spatial layer;
   determining a third MMIB based on data received at the spatial layer by using a second detector used in a codeword unit;
   determining a parameter which is associated with the second detector, based on the first MMIB, the second MMIB, and the third MMIB; and
   generating channel quality information for the spatial layer based on the first MMIB, the second MMIB and the determined parameter,
   wherein determining the first MMIB comprises:
   determining a first plurality of signal-to-interference plus noise ratios (SINRs) for a plurality of resource elements allocated to the first signal, each of the first plurality of SINRs corresponding to each of the plurality of resource elements;
   determining a first plurality of MMIBs based on the first plurality of SINRs, each of the first plurality of MMIBs corresponding to each of the first plurality of the SINRs; and
   determining the first MMIB for the codeword by averaging the first plurality of the MMIBs,
   wherein determining the second MMIB comprises:
   determining a second plurality of SINRs for the plurality of resource elements allocated to the second signal, each of the second plurality of SINRs corresponding to each of the plurality of the resource elements;
   determining a second plurality of MMIBs based on the second plurality of SINRs, each of the second plurality of MMIBs corresponding to each of the second plurality of the SINRs; and
   determining the second MMIB for the codeword by averaging the second plurality of the MMIBs, and
   wherein determining the third MMIB comprises:
   determining a log likelihood ratio (LLR) for the data received at the spatial layer by using the second detector; and
   determining the third MMIB corresponding to the determined LLR for the received data by using a table indicating a mapping relationship between an MMIB and an absolute value of an LLR,
   wherein the plurality of resource elements corresponds to the codeword.

2. The method of claim 1, wherein generating the channel quality information comprises:
   determining a fourth MMIB for the codeword based on the first MMIB, the second MMIB, and the determined parameter associated with the second detector; and generating the channel quality information for the spatial layer based on the fourth MMIB.

3. The method of claim 1,
wherein the parameter is determined based on a first modulation order and a second modulation order,
wherein the first modulation order is applied to at least one of the first MMIB, the second MMIB, and the third MMIB, and
wherein the second modulation order is not transmitted to the apparatus.

4. The method of claim 1,
wherein the parameter is determined by, $$\beta_l = \frac{\mu_{DATA,l} - \mu_{MMSE,l}}{\mu_{IF,l} - \mu_{MMSE,l}} \quad l = 0, 1, \ldots, L-1$$

wherein $\beta_l$ denotes the parameter relating to the second detector in a l-th space layer, $\mu_{MMSE,l}$ denotes the first MMIB in the l-th space layer, $\mu_{IF,l}$ denotes the second MMIB in the l-th space layer, and $\mu_{DATA,l}$ denotes the third MMIB in the l-th space layer.

5. The method of claim 1,
wherein the parameter is determined by, $$\mu_{ML,l} = \beta_l \mu_{IF,l} + (1-\beta_l)\mu_{MMSE,l}, \quad l=0,1,\ldots,L-1$$

wherein $\beta_l$ denotes the parameter relating to the second detector in a l-th space layer, $\mu_{MMSE,l}$ denotes the first MMIB in the l-th space layer, and $\mu_{IF,l}$ denotes the second MMIB in the l-th space layer.

6. The method of claim 1,
wherein the first detector includes a minimum mean squared error (MMSE) detector, and
wherein the second detector includes a maximum likelihood (ML) detector.

7. An apparatus for measuring channel quality in a multi input multi output (MIMO) system, comprising:
a mean mutual information per bit (MMIB) determination unit configured to:
determine a first MMIB for a codeword based on an assumption that a first signal is received at a spatial layer by using a first detector;
determine a second MMIB for the codeword based on an assumption that a second signal having no interference with other signals is received at a spatial layer;
determine a third MMIB based on data received at the spatial layer by using a second detector used in a codeword unit;
determine a parameter associated with the second detector based on the first MMIB, the second MMIB, and the third MMIB, and
a channel quality information determination unit configured to generate channel quality information for the spatial layer based on the first MMIB, the second MMIB, and the determined parameter, and
wherein the MMIB determination unit is configured to:
determine a first plurality of signal-to-interference plus noise ratios (SINRs) for a plurality of resource elements allocated to the first signal, each of the first plurality of SINRs corresponding to each of the plurality of resource elements;
determine a first plurality of MMIBs based on the first plurality of SINRs, each of the first plurality of MIMBs corresponding to each of the first plurality of SINRs; and determine the first MMIB for the codeword by averaging the first plurality of MMIBs, wherein the MMIB determination unit is configured to:
determine a second plurality of SINRs for the plurality of resource elements allocated to the second signal, each of the second plurality of SINRs corresponding to each of the plurality of resource elements;
determine a second plurality of MMIBs based on the second plurality of SINRs, each of the second plurality of MMIBs corresponding to each of the second plurality of SINRs; and
determine the second MMIB for the codeword by averaging the second plurality of MMIBs,
wherein the MMIB determination unit is configured to:
determine a log likelihood ratio (LLR) for the received data by using the second detector; and
determine the third MMIB corresponding to the determined LLR for the data received at the spatial layer by using a table indicating a mapping relationship between an MMIB and an absolute value of an LLR, and
wherein the plurality of resource elements corresponds to the codeword.

8. The apparatus of claim 7,
wherein the MMIB determination unit is configured to determine a fourth MMIB for the codeword based on the first MMIB, the second MMIB, and the determined parameter associated with the second detector, and
wherein the channel quality information determination unit is configured to generate the channel quality information for the spatial layer based on the fourth MMIB.

9. The apparatus of claim 7,
wherein the parameter is determined based on a first modulation order and a second modulation order,
wherein the first modulation order is applied to at least one of the first MMIB, the second MMIB, and the third MMIB, and
wherein the second modulation order is not transmitted to the apparatus.

10. The apparatus of claim 7,
wherein the parameter is determined by, $$\beta_l = \frac{\mu_{DATA,l} - \mu_{MMSE,l}}{\mu_{IF,l} - \mu_{MMSE,l}} \quad l = 0, 1, \ldots, L-1$$

wherein $\beta_l$ denotes the parameter relating to the second detector in a l-th space layer, $\mu_{MMSE,l}$ denotes the first MMIB in the l-th space layer, $\mu_{IF,l}$ denotes the second MMIB in the l-th space layer, and $\mu_{DATA,l}$ denotes the third MMIB in the l-th space layer.

11. The apparatus of claim 7,
wherein the parameter is determined by, $$\mu_{ML,l} = \beta_l \mu_{IF,l} + (1-\beta_l)\mu_{MMSE,l}, \quad l=0,1,\ldots,L-1$$

wherein $\beta_l$ denotes the parameter relating to the second detector in a l-th space layer, $\mu_{MMSE,l}$ denotes the first MMIB in the l-th space layer, and $\mu_{IF,l}$ denotes the second MMIB in the l-th space layer.

12. The apparatus of claim 7,
wherein the first detector includes a minimum mean squared error (MMSE) detector, and
wherein the second detector includes a maximum likelihood (ML) detector.

* * * * *